United States Patent [19]
Dorschky et al.

[11] Patent Number: 6,055,141
[45] Date of Patent: Apr. 25, 2000

[54] PROTECTIVE DEVICE FOR AN ELECTRIC MOTOR CORRESPONDING PROCESS AND DRIVE DEVICE WITH AN ELECTRIC MOTOR INCLUDING SAID PROTECTIVE DEVICE

[75] Inventors: Jurgen Dorschky, Saint Mery; Christian Millet, Rouvres, both of France

[73] Assignee: Control Devices, Inc., Standish, Me.

[21] Appl. No.: 08/918,369

[22] Filed: Aug. 26, 1997

[51] Int. Cl.[7] ...................................................... H02H 5/04
[52] U.S. Cl. .............................. 361/25; 361/26; 361/105; 318/471
[58] Field of Search ........................... 310/68 C; 318/434, 318/471–473; 361/25, 26, 103, 105, 118, 127, 106

[56] References Cited

U.S. PATENT DOCUMENTS

| | | | |
|---|---|---|---|
| 4,092,573 | 5/1978 | D'Entremont | 318/783 |
| 4,097,790 | 6/1978 | Wilson | 318/471 |
| 4,114,077 | 9/1978 | Oates et al. | 318/473 |
| 4,207,602 | 6/1980 | Kussy | 361/24 |
| 4,574,229 | 3/1986 | Kim | 318/788 |
| 4,612,480 | 9/1986 | Kneisel | 315/224 |
| 4,897,584 | 1/1990 | Grutzmacher et al. | 318/471 |
| 5,408,165 | 4/1995 | Voet | 318/523 |
| 5,546,262 | 8/1996 | Baurand et al. | 361/31 |

*Primary Examiner*—Michael J. Sherry
*Attorney, Agent, or Firm*—Woodard, Emhardt, Naughton, Moriarity & McNett

[57] ABSTRACT

A protective device suitable for being placed in the power supply circuit of an electric motor, having at least one anti-interference coil (20, 30) for the motor, and a thermal switch (10) thermally coupled to coil (20, 30) and capable of opening the power supply circuit when the coil temperature which it detects reaches a predetermined value, representative of the maximum temperature threshold allowed within the motor. Advantageously, the device also has an electric heating element, thermally coupled to the switch and capable of constituting a main current path between the two input terminals of a four-terminal network consisting of the protective device, when the power supply circuit is open, and capable of holding this circuit open in order to limit the opening-closing cycles of the switch, the invention also pertains to the corresponding process and to a drive device containing a motor and of said protective device mounted on the motor, outside of it.

18 Claims, 2 Drawing Sheets

PROTECTIVE DEVICE FOR AN ELECTRIC MOTOR CORRESPONDING PROCESS AND DRIVE DEVICE WITH AN ELECTRIC MOTOR INCLUDING SAID PROTECTIVE DEVICE

TECHNICAL FIELD OF THE INVENTION

The present invention generally relates to electric motor thermal protectors and, more particularly, to the protection against electromagnetic interference emitted by electric motors and to the thermal protection of these motors.

BACKGROUND OF THE INVENTION

For reasons of space requirements, weight, and cost, manufacturers are led increasingly to reduce the dimensions of electric motors. This greatly increases the need to protect the electric motor from excessive heating which would be fatal to it (damage to the brushes, separation of the commutator segments, short-circuiting of the armature, etc.).

In order to avoid the specific problems of space requirements mentioned above which would be further increased if the thermal protection were incorporated inside the motors, manufacturers have gradually turned to the study of thermal protection arranged outside the motors. Such an arrangement can also prevent manufacturers from having to individually customize the motors according to the different specifications presented by their clients during assembly, and therefore from having to manage a great stock of different parts for the production line.

An example of external thermal protection is given in Patent No. GB-A-2,668,661, in an internal combustion engine starter application. Essentially, a thermal switch is thermally coupled to the ferrule of a power supply cable of the electric starter, wherein the ferrule size is chosen so that the heat produced in the ferrule is proportional to the internal temperature of the starter. The thermal switch is capable of cutting the power supply of the starter when the temperature of the cable ferrule exceeds an index temperature corresponding to a maximum authorized temperature within the starter.

For the same specific reasons of space requirements, manufacturers have also turned towards anti-interference devices for electric motors arranged outside of the motors. For this purpose, it is known to use in particular capacitors and/or anti-interference coils intended to filter the interference frequencies. In a widespread form of execution, the anti-interference coil consists of a solenoid with a coil wound on a cylindrical ferrite core.

All the protective devices mentioned above are generally satisfactory. However, it would be desirable to be able to obtain protection from electromagnetic interference and thermal protection in a simpler manner using more compact means, due to the ever-shrinking size requirements for electric motors. The present invention is directed toward meeting this need.

SUMMARY OF THE INVENTION

The present invention generally proposes a process of protection, consisting of providing anti-interference protection of an electric motor outside the motor by means of at least one anti-interference coil, characterized by the fact that it moreover consists of:

detecting the temperature of the anti-interference coil(s); and opening the electric power supply circuit for the motor when the detected temperature reaches a predetermined value representative of a maximum temperature threshold allowed within the electric motor.

By utilizing such a process, the above-mentioned needs can be responded to, because the protection from electromagnetic interference and thermal protection are produced by a common means.

In effect, the inventors realized that the anti-interference coils of electric motors are capable of reproducing the variations of temperature generated within an electric motor to which they are connected and outside of which they are arranged.

A corresponding protective device, suitable for being placed in the power supply circuit of the motor, having at least one anti-interference coil for the motor and characterized by the fact that it also has a thermal switch thermally coupled to the coil and capable of opening the power supply circuit when the coil temperature which it detects reaches a predetermined value, representative of a maximum temperature threshold allowed within the electric motor, proves to be particularly compact.

Furthermore, it is no longer necessary to individualize the electric motor itself, but it is simply necessary to connect it to a protective device corresponding to specific specifications of the client.

In a preferred embodiment, the protective device constitutes a four-terminal network. Advantageously, in this preferred embodiment, the coil and the thermal switch are arranged in series between a first input and a first output of the four-terminal network, and the protective device also has a second anti-interference coil thermally coupled to the thermal switch and arranged between the second input and the second output of the four-terminal network. The use of two anti-interference coils allows one to produce a device which is even more compact and effective in terms of anti-interference, while guaranteeing close thermal contact between the anti-interference part and the thermal switch.

In order to improve the anti-interference further, the protective device also has an additional interference suppression element arranged between the two output terminals of the four-terminal network. In order to filter frequencies below those filtered by the anti-interference coils, the additional element advantageously consists of a capacitor or a varistor.

According to a particularly advantageous feature of the present invention, the protective device can also have an electric heating element, such as a resistor, thermally coupled to the thermal switch and capable of constituting a main current path between the two input terminals of the four-terminal network when the power supply circuit of the motor is open, and capable of holding the power supply circuit open by the heating of the thermal switch.

Thanks to these arrangements, the number of opening and closing cycles of the supply circuit by the thermal switch can be limited as long as the power supply is maintained at the input terminals of the four-terminal network, and consequently the wear and tear of the thermal switch can also be limited.

In a similar way, in the context of the process described above, the electrical supply circuit of the motor advantageously is kept open as long as current is applied to this circuit.

The protective device can also have metal connecting lugs suitable for being connected to a power source, on the one hand, and to the power supply terminals of an electric motor, on the other.

According to another feature, the present invention proposes a drive device with electric motor, characterized by the fact that it has an electric motor and a protective device, as defined above, mounted on this electric motor, external to it.

The protective device can be connected either to the power supply terminals of the electric motor or to the brushes of this same motor.

BRIEF DESCRIPTION OF THE DRAWINGS

Other characteristics and advantages of the present invention will emerge from the following description given with regard to the appended drawing in which.

DETAILED DESCRIPTION OF THE PREFERRED EMBODIMENT

Figure 1:
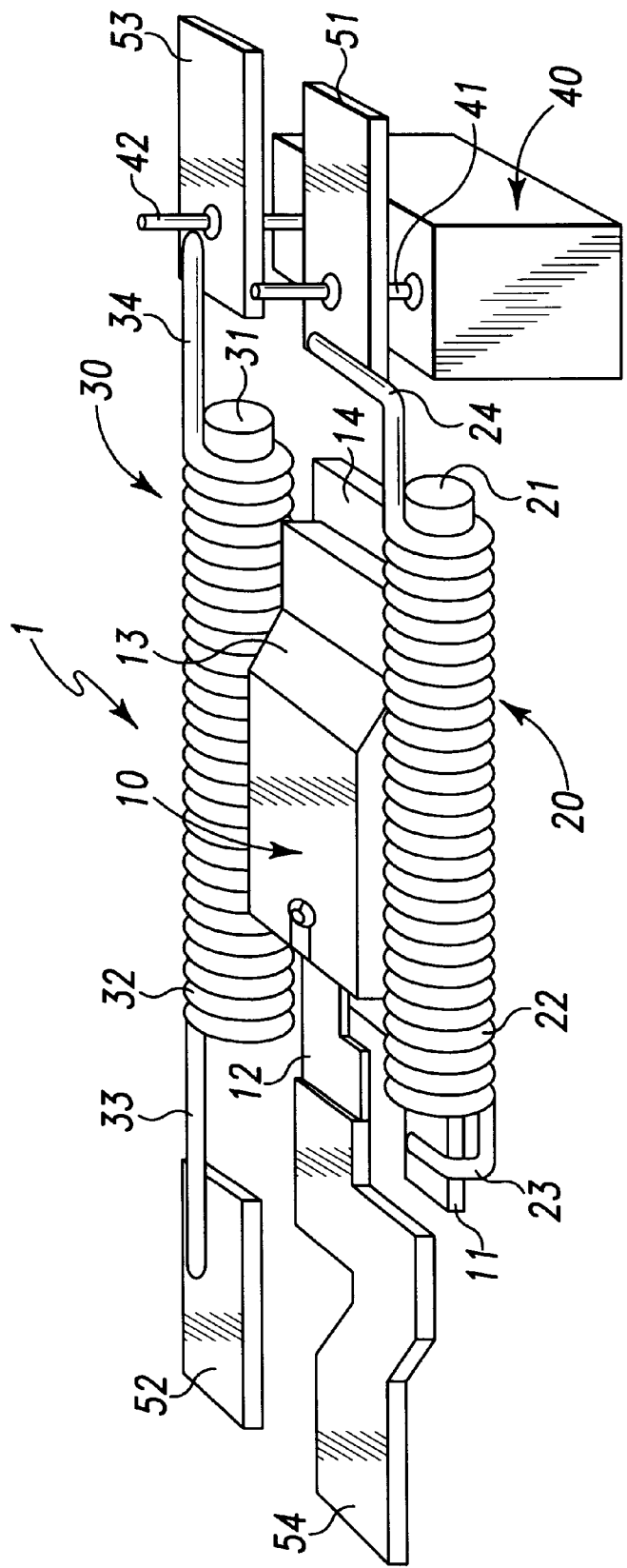
FIG. 1 is a perspective view of a protective device according to the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and further applications of the principles of the invention as illustrated therein being contemplated as would normally occur to one skilled in the art to which the invention relates.

A first embodiment of the protective device according to the present invention is represented in FIG. 1.

This protective device 1 in this case generally consists of thermal switch 10, two anti-interference coils 20, 30, and varistor 40. More precisely, each of the anti-interference coils has ferrite core 21, 31 on which enameled copper wire 22, 32 is wound. Free ends 23, 24 of enameled copper wire 22 constituting a solenoid are respectively soldered on terminal 11 of thermal switch 10 and on metal connecting lug 51. Each of free ends 33, 34 of enameled copper wire 32 constituting the solenoid of the other anti-interference coil 30 is also soldered on metal connecting lug 52, 53.

Each of lugs 51, 53 is passed through by a pin of varistor 40. These pins 41, 42 constitute the two terminals of varistor 40 and are soldered on connecting lugs 51, 53. One will note here that in other embodiments, the attachments by soldering mentioned above can be replaced by crimping or other equivalent attachment.

A fourth metal connecting lug 54 is furthermore soldered to second terminal 12 of the thermal switch 10. One will observe here that the two terminals 11, 12 of thermal switch 10 are also present in the form of metal lugs. Thermal switch 10 has metal housing 13 attached on stainless steel baseplate 14 which has thermal detection surfaces. The two anti-interference coils 20, 30 are adhered to the thermal detection surfaces of the housing, parallel to one another. More precisely, coils 20, 30 are adhered in the angle formed by the detection surfaces in the same plane as and perpendicular to baseplate 14 and the baseplate 14 itself.

Adhesion prevents any deterioration of wires 22, 32 because of possible vibrations, deterioration which could lead to a short circuit or to alteration of the performances of protective device 1.

Lugs 51 and 53, which are soldered to pins 41, 42 of varistor 40, are themselves also parallel to one another, as are the other two connecting lugs 52 and 54.

The anti-interference coils are conventional and straight coils ensuring optimal thermal coupling to thermal switch 10. In effect, thermal switch 10 in this case has a bimetallic sensor within metal housing 13. When an index temperature, detected by the detection surfaces of switch 10 in contact with heat sources constituted by coils 20, 30, under the conditions detailed hereafter, is reached, the contacts of the bimetallic sensor separate and interrupt the flow of current between terminals 11 and 12.

The entire protective device 1 is enclosed in a housing made of plastic material (not shown) sealed at the parting lines by ultrasonic soldering or by means of a seal. The connecting lugs marked 51 to 54 emerge from this plastic housing. The latter housing can be provided with a marking indicating the characteristic of protective device 1.

Figure 2:
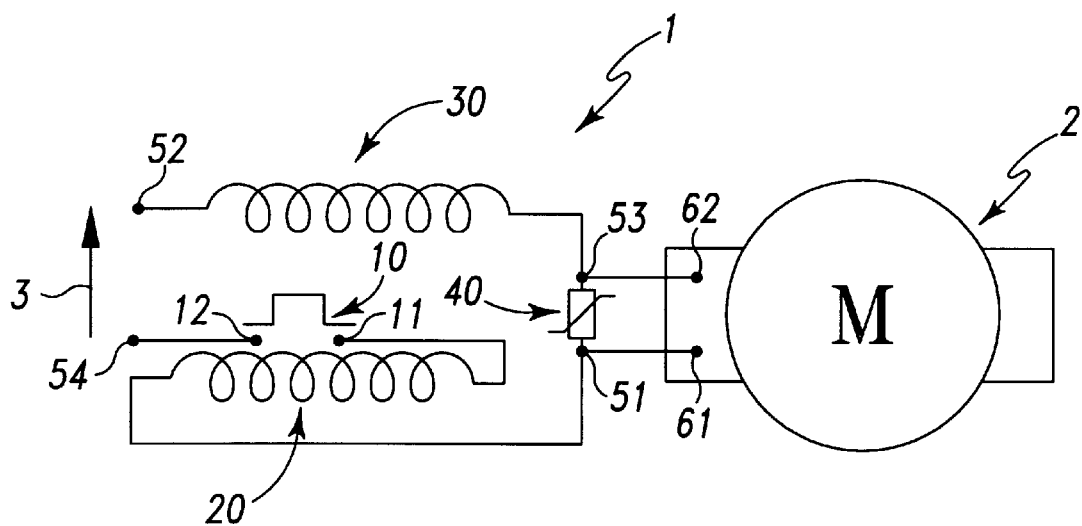
FIG. 2 represents an electric circuit in which the device of FIG. 1 is placed.

With aid of FIG. 2, the functioning of this protective device will now be described. FIG. 2 represents, in the form of a schematic electrical diagram, protective device 1 placed in a power supply circuit of electric motor 2. The power source is represented by arrow 3 and can be a battery, for example. The power source is connected to the two input terminals of the four-terminal network consisting in this case of protective device 1 and which is practically represented by connecting lugs 52 and 54. This connection can be formed either by direct connection of connecting lugs 52, 54 with the terminals of power source 3, or by means of wire connections, for example, using flexible conductors.

Each of the output terminals of the four-terminal network which consists of protective device 1 and is practically represented by connecting lugs 51, 53, is connected to terminal 61, 62 of electric motor 2. The connection can be formed either by direct connection of connecting lugs 51, 53 to terminals 61, 62, or by means of wire connections, for example, flexible conductors.

In other embodiments, the connections of protective device 1 to power source 3, on the one hand, and to electric motor 2 on the other, can also be produced by giving lugs 51 to 54 a specific connection configuration. Connecting lugs 51 to 54 can also be replaced by equivalent connecting means, known to those having skill in the art, and a connection can also be provided at the terminals of the brushes of motor 2 by means of flexible conductors, instead of a connection at the input and output terminals 61, 62.

As seen more clearly in FIG. 2, between first input terminal 52 and first output terminal 53 of the four-terminal network is arranged one of the anti-interference coils 30, whereas between the second input terminal 54 and second output terminal 51 of the four-terminal network, thermal switch 10 and the other anti-interference coil 20 are arranged in series. Furthermore, varistor 40, which can be likened to two back-to-back Zener diodes, is arranged between the two output terminals of the four-terminal network, and is thus located as close as possible to the motor in order to ensure the best interference suppression possible.

Thus, when current is applied to input terminals 52 and 54 of the four-terminal network consisting of protective device 1, the latter produces the interference suppression of electric motor 2. More precisely, anti-interference coils 20, 30 filter the electromagnetic interference associated with the high frequencies generated by electric motor 2, while the varistor filters the electromagnetic interference associated with the low frequencies generated by electric motor 2. In other words, protective device 1 protects the electric network in which protective device 1 is mounted, motor 2, and power source 3 from this electromagnetic interference emitted by electric motor 2. On the other hand, protective device 1 also provides thermal protection to electric motor 2. In effect, the inventors realized that the anti-interference coils, through which the same current flows as in the electric motor, are capable of constituting thermal equivalents or images of this same motor, outside of it. In other words, anti-interference coils 20, 30 reproduce the variations of temperature appearing within electric motor 2 and transmit them with a minimum of thermal inertia to thermal switch 10, which is closely connected to them.

Thus, if because of an overload or a locking up of electric motor 2, abnormal heating occurs inside the motor, the preset or index temperature assigned to thermal switch 10 is reached, and the contacts of its bimetallic sensor separate and open the power supply circuit of electric motor 2, stopping it.

In this case, locking up is understood to mean a locking in terms of rotation of the rotor of electric motor 2, while this motor is still drawing current. Such a locking up can be due to any abnormality, such as, locking of a window due to frost, leading to locking up of the rotation of the rotor of the power window motor.

Electric motor 2 is again supplied with power only when the overload or locking up is removed, allowing the temperature of anti-interference coils 20, 30 to drop below the closing temperature, allowing the contacts of the bimetallic sensor to come back in contact with one another and to close the power supply circuit of an electric motor 2.

Besides the advantages already mentioned above, protective device 1 of the present invention, thanks to the encapsulation in the housing, allow one to lengthen the opening/closing cycles of the switch and consequently to reduce the average stabilized temperature of the electric motor.

Furthermore, it will be possible to use a low temperature functioning of the electric motor.

In practice, in a particular application of the electric circuit of FIG. 2, protective device 1 and electric motor 2 have the following characteristics:

2: Automobile Power Window Motor
  power supply: 12 vDC
  nominal current: 2 A
  coil: 19 turns of 0.45 mm cross section
  35 rotor disk laminations
1: Protective Device
  varistor 40: varistor marketed by Siemens under the part number SHCV-SRIK20M105Z and having 1 $\mu$F.
  anti-interference coils 20, 30:
  19 turns of enameled wire, diameter 0.9 mm
  4.2 $\mu$H
  thermal switch 10: Type VP 3C001 marketed by Control Devices, Inc.
  bimetal having a resistivity of 70 $\Omega$CMF
  index or triggering temperature: 132 to 155° C.
  reclosing temperature: approximately 85° C.
  triggering time at 20 A: 11 to 23 sec.

Figure 3:
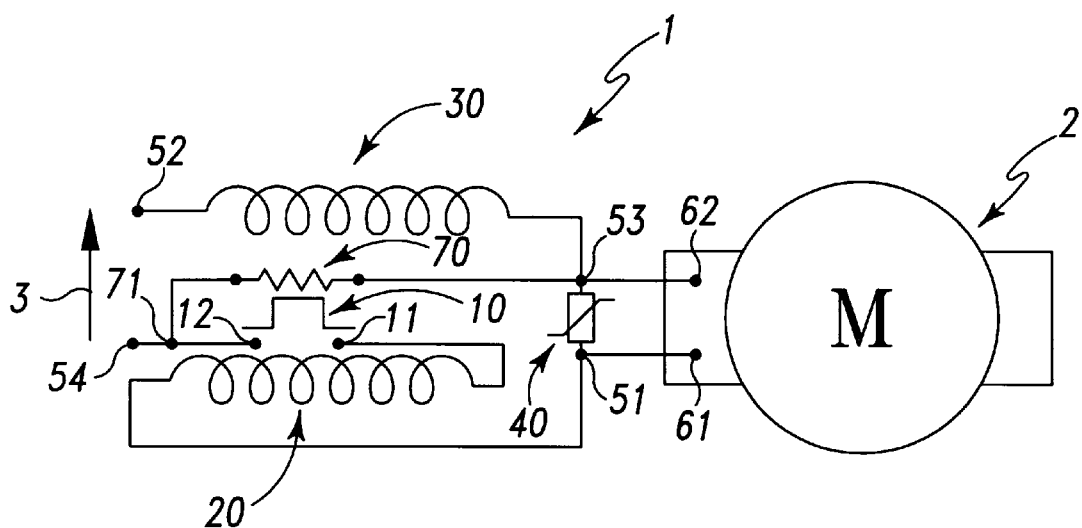
FIG. 3 represents an electric circuit in which a protective device according to a preferred embodiment of the present invention is placed.

In a preferred embodiment shown in FIG. 3, protective device 1 also has electric heating element 70, in this case a resistor, also thermally coupled to thermal switch 10. One of its terminals is connected to the link between power source 3 and terminal 12 of switch 10, that is to say, in practice, to lug 54. Another terminal is connected to the link between coil 30 and varistor 40, that is, in practice, to lug 53.

This resistor 70 is chosen so as to constitute a main current path between input terminals 52, 54 of the four-terminal network when the supply circuit of electric motor 2 is open and so as to hold the circuit open by means of heating or thermal switch 10, as long as current is still applied to input terminals 52, 54 of the four-terminal network. Thermal switch 10 is thus prevented from running numerous and unnecessary opening/closing cycles when current is applied to terminals 52, 54 and electric motor 2 overloads or locks up. Electric motor 2 is thus only repowered when the temperature drops below the index reclosing temperature.

Heating element 70 is also adhered to metal housing 13. The resistor will of course be chosen so as not to constitute a continuous main current path between the two input terminals of the four-terminal network.

In other embodiments, instead of a bimetallic sensor, thermal switch 10 can have a thermocouple, a probe with a negative temperature coefficient (NTC) or a positive temperature coefficient (PTC), a thermostat, or can consist of a thermal switch based on polymers, whose resistance increases very rapidly with temperature.

In this case, opening of the circuit will be understood to mean a very high resistance on this circuit, stopping the flow of current.

The varistor can also be replaced by a capacitor.

Furthermore, protective device 1 can be inserted in an electrical network, between the power source and the electric motor, which contains various other elements besides those shown in FIGS. 2 and 3.

It will also be possible to provide interference suppression for several motor speeds by an appropriate connection of interference suppression elements to the corresponding terminals of the electric motor.

Of course, the interference suppression means will be placed as close as possible to the main source of the interference, that is to say the contact between the brushes and the commutator of the electric motor.

Other electrical diagrams equivalent to those present in reference to FIGS. 2 and 3 can of course be envisioned. For example, a thermal switch and an anti-interference coil thermally coupled to one another can simply be arranged in series, a terminal of the switch being connected to a power source whose second terminal is grounded, whereas the second terminal of the anti-interference coil is connected to a terminal of the motor whose second terminal is also grounded.

It will also be possible to provide an assembly with an anti-interference coil in parallel on the two terminals of the electric motor or else a four-terminal network with a thermal switch between an input terminal and an output terminal of the four-terminal network and an anti-interference coil between the other two terminals, the coil and the switch being thermally coupled to one another.

In a general manner, the bimetallic sensor will be chosen according to the specifications required for the thermal protection of the motor, particularly with regard to the ohmic value of the bimetal, the resistivity of the metal housing, and triggering temperature. The same is true for the anti-interference coils, particularly with regard to the diameter of the wire which will be determined so as to obtain an optimal thermal effect, and to the material of the wire (copper, copper alloy or another material of appropriate resistivity).

In this regard, the metal housing will be selected to be formed from a metal allowing for the best possible thermal exchange.

Finally, those having skill in the art will also be able to use an electronic circuit instead of resistor 70 in order to hold the electrical supply circuit of the motor open as long as current is applied to this circuit.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of providing thermal protection of an electric motor, comprising the steps of:

(a) producing interference suppression of said motor outside of said motor by passing a supply current of said motor through at least one anti-interference coil;

(b) detecting the temperature of the anti-interference coil(s); and (c) opening an electric power supply circuit to the motor when the detected temperature reaches a predetermined value representative of a maximum temperature threshold allowed within the electric motor.

2. The method of claim 1, wherein step (c) further comprises keeping the power supply circuit open as long as current is applied to said power supply circuit.

3. A protective device, suitable for being placed in a power supply circuit of an electric motor, comprising:

at least one anti-interference coil coupled to the motor outside of said motor such that a supply current of said motor passes through said at least one anti-interference coil;

a thermal switch thermally coupled to said at least one anti-interference coil and capable of opening the power supply circuit when a temperature of the at least one anti-interference coil reaches a predetermined value, representative of a maximum temperature threshold allowed within said electric motor.

4. The protective device of claim 3, wherein the at least one anti-interference coil and the thermal switch form a four-terminal network.

5. The protective device of claim 4, wherein the at least one anti-interference coil and the thermal switch are arranged in series between a first input and a first output of the four-terminal network, and wherein the device further comprises a second anti-interference coil arranged between a second input and a second output of the four-terminal network, wherein the second anti-interference coil is thermally coupled to the thermal switch.

6. The protective device of claim 5, further comprising an additional interference suppression element arranged between the two output terminals of the four-terminal network.

7. The protective device of claim 4 further comprising:

an electrical heating element thermally coupled to the thermal switch and capable of constituting a main current path between two input terminals of the four-terminal network when the power supply circuit of the motor is open, wherein the electrical heating element is capable of holding the power supply circuit open by heating of the thermal switch.

8. The protective device of claim 3, wherein the protective device is mounted in a sealed housing.

9. The protective device of claim 3, wherein each of said at least one anti-interference coils comprises a ferrite core on which enameled copper wire is wound.

10. The protective device of claim 3, wherein said thermal switch includes a bimetallic sensor enclosed in a metal housing which has thermal detection surfaces.

11. The protective device of claim 10, wherein each of said at least one anti-interference coil is adhered to the metal housing.

12. The protective device of claim 3, wherein said thermal switch includes a thermocouple.

13. The protective device of claim 3, wherein the thermal switch includes a probe with a negative temperature coefficient (NTC).

14. The protective device of claim 3, wherein the thermal switch includes a probe with a positive temperature coefficient (PTC).

15. The protective device of claim 6, wherein the additional interference suppression element is a varistor.

16. A drive device, comprising:

an electric motor; and a protective device mounted to and outside of the electric motor, wherein the protective device comprises:

at least one anti-interference coil coupled to the motor outside of said motor such that a supply current of said motor passes through said at least one anti-interference coil;

a thermal switch thermally coupled to said at least one anti-interference coil and capable of opening the power supply circuit when a temperature of the at least one anti-interference coil reaches a predetermined value, representative of a maximum temperature threshold allowed within said electric motor.

17. The device of claim 16, wherein the protective device is connected to power supply terminals of the electric motor.

18. The device of claim 16, wherein the protective device is connected to the brushes of the electric motor.

* * * * *

UNITED STATES PATENT AND TRADEMARK OFFICE
CERTIFICATE OF CORRECTION

PATENT NO : 6,055,141
DATED : April 25, 2000
INVENTOR(S) : Dorschky et al.

It is certified that error appears in the above-identified patent and that said Letters Patent are hereby corrected as shown below:

On the front page of the patent, following "*Attorney, Agent, or Firm*", please change "Moriarity" to --Moriarty--.

Signed and Sealed this

Fifteenth Day of May, 2001

*Attest:*

NICHOLAS P. GODICI

*Attesting Officer*   *Acting Director of the United States Patent and Trademark Office*